(12) United States Patent
King et al.

(10) Patent No.: US 10,970,360 B2
(45) Date of Patent: *Apr. 6, 2021

(54) TECHNIQUE FOR GENERATING DIGITAL CERTIFICATES

(71) Applicant: Edinvent Inc., Mountain View, CA (US)

(72) Inventors: Daniel King, Mountain View, CA (US); Alan Heppenstall, Mountain View, CA (US)

(73) Assignee: Edinvent Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,061

(22) Filed: Oct. 24, 2019

(65) Prior Publication Data

US 2020/0057785 A1    Feb. 20, 2020

Related U.S. Application Data

(63) Continuation of application No. 15/965,720, filed on Apr. 27, 2018, now Pat. No. 10,467,319.

(60) Provisional application No. 62/546,503, filed on Aug. 16, 2017.

(51) Int. Cl.
| | |
|---|---|
| *G06F 16/958* | (2019.01) |
| *G06F 16/955* | (2019.01) |
| *G06Q 10/10* | (2012.01) |
| *G09B 5/08* | (2006.01) |
| *G06F 40/103* | (2020.01) |
| *G06F 40/174* | (2020.01) |
| *G06F 40/186* | (2020.01) |
| *G06Q 50/20* | (2012.01) |

(52) U.S. Cl.
CPC ........ *G06F 16/958* (2019.01); *G06F 16/9566* (2019.01); *G06F 40/103* (2020.01); *G06F 40/174* (2020.01); *G06F 40/186* (2020.01); *G06Q 10/109* (2013.01); *G09B 5/08* (2013.01); *G06Q 50/20* (2013.01)

(58) Field of Classification Search
CPC . G06F 16/20; G06F 16/30; G06F 3/04; G06F 16/958; G06F 40/103; G06F 40/174; G06F 40/186; G06F 16/9566; G06Q 50/20; G06Q 50/20; G06Q 10/109; G09B 5/08

See application file for complete search history.

(56) References Cited

U.S. PATENT DOCUMENTS

| | | |
|---|---|---|
| 9,112,730 B2 | 8/2015 | Dewaele et al. |
| 10,033,536 B2 | 7/2018 | Mercury et al. |
| 2004/0078225 A1 | 4/2004 | Schramm-Apple et al. |

(Continued)

FOREIGN PATENT DOCUMENTS

CN    102509196 B    4/2015

*Primary Examiner* — Sanchita Roy
(74) *Attorney, Agent, or Firm* — Perkins Coie LLP; Brian Coleman

(57) ABSTRACT

Issuing and managing digital certificates for students is described. A server can receive organization information regarding an educational institution, group information regarding a course, and certificate information regarding the types of content to be displayed upon a digital certificate indicating that a student has completed the course. The server can generate a digital certificate template indicating the types of content and layout of that content for generating digital certificates. The digital certificates can then be generated and published to webpages for students.

25 Claims, 13 Drawing Sheets

(56) References Cited

U.S. PATENT DOCUMENTS

| | | |
|---|---|---|
| 2008/0014569 A1 | 1/2008 | Holiday et al. |
| 2012/0231438 A1 | 9/2012 | Fakhrai |
| 2014/0351914 A1 | 11/2014 | Suresh et al. |
| 2015/0010894 A1 | 1/2015 | Morisset |
| 2016/0293025 A1 | 10/2016 | Marr et al. |
| 2017/0270079 A1 | 9/2017 | Rajwat et al. |

US 10,970,360 B2

TECHNIQUE FOR GENERATING DIGITAL CERTIFICATES

CLAIM FOR PRIORITY

This application is a continuation of a co-pending U.S. patent application Ser. No. 15/965,720 filed Apr. 27, 2018, now U.S. Pat. No. 10,467,319, which claims priority to U.S. Provisional Patent Application No. 62/546,503, entitled "Digital Certificate Management," By King, and filed on Aug. 16, 2017. The content of the above-identified application is incorporated herein by reference in its entirety.

TECHNICAL FIELD

This disclosure relates to digital certificates, and in particular managing digital certificates.

BACKGROUND

Organizations often provide certificates to students or employees upon completion of training. For example, a university can provide a diploma as a certificate to a student indicating that the student is a graduate in a particular program offered by the university. A language institute might provide a certificate to a student indicating that the student is proficient in speaking a particular language. A business might provide a certificate to an employee indicating that the employee has completed an internal training program.

These certificates are often printed on paper and can also be hand-signed, embossed, etc. and then packaged in an envelope and mailed. However, providing certificates to hundreds or thousands of students can be an expensive and time-consuming process.

SUMMARY

Some of the subject matter described herein includes a method for issuing and managing digital certificates for students of an educational institution or a business institution providing a course for study, the digital certificate providing an indication of completion of the course, the method comprising: receiving organization information indicating a name of the educational institution or the business institution providing the course; receiving group information indicating a name of the course; receiving certificate information indicating types of content to be displayed upon the digital certificates to be issued and positions of the content upon the digital certificates to be issued, the types of content selected from the organization information and the group information; generating, by a processor, a digital certificate template corresponding to the certificates to be issued to students of the course based on the certificate information; receiving recipient information indicating students who completed the course and should be issued digital certificates, and the recipient information indicating email addresses for each of the students; publishing, by the processor, digital certificates for each of the students based on the digital certificate template, each of the digital certificates including content based on the certificate information and names of the students as indicated by the recipient information, and each of the digital certificates published at a corresponding webpage having a universal resource locator (URL); sending emails to each of the students based on the email addresses indicated in the recipient information, the emails providing each of the students access to their corresponding digital certificate published upon the webpages by providing the corresponding URL; and provide the digital certificates for display on webpages when the students access the webpages via the URLs.

Some of the subject matter described herein also includes a method, comprising: receiving organization information representing a name of an institution providing a course; receiving group information representing a name of the course; generating, by a processor, a digital certificate template representing a layout of information to be displayed upon digital certificates to be issued to students who have taken the course, the information to be displayed upon the digital certificates including the name of the institution and the name of the course; receiving a list of names of students who have completed the course, the list of names including a first student; and generating, by the processor, a first digital certificate based on the digital certificate template and indicating that the first student has completed the course, the generating including generating a first webpage providing the first digital certificate as a representation that the first student has completed the course.

In some implementations, the first digital certificate includes content indicating the name of the course, the name of the institution, and the name of the first student.

In some implementations, the list of names also includes a second student, and the method further comprising: generating a second digital certificate based on the digital certificate template and indicating that the second student has completed the course.

In some implementations, the method includes generating a second webpage providing the second digital certificate as a representation that the second student has completed the course, each of the first webpage and the second webpage having different universal resource locators (URLs).

In some implementations, the URLs are based on a corresponding certificate identifier determined upon generation of the first digital certificate and the second digital certificate.

In some implementations, the method includes: receiving a request to change information displayed upon the first digital certificate from the first student; and updating content displayed upon the first digital certificate to reflect the change requested.

In some implementations, the method includes: receiving, from the first student, additional information related to the course; and publishing the additional information on the first webpage including the first certificate.

In some implementations, the additional information includes a course transcript, a recommendation from a teacher providing the course, or work product completed by the student during the course.

In some implementations, the method includes providing a recommendation to the first student regarding another course to complete, the recommendation based on one or both of the name of the course or the additional information provided by the first student.

Some of the subject matter described herein also includes a system, including: a database configured to store a name of an institution providing a course, group information representing a name of the course, and a digital certificate template representing a layout of content to be displayed upon digital certificates published on webpages for students who have completed the course; a certificate generation module configured to publish a first digital certificate upon a first webpage at a first universal resource locator (URL) based on the digital certificate template, the first digital certificate representing that a first student has completed the course, the first digital certificate including the name of the course and the name of the institution; and a certificate provisioning module configured to provide a first message to the first student providing access to the first webpage with the first digital certificate at the first URL.

In some implementations, the first digital certificate includes content indicating the name of the course, the name of the institution, and the name of the first student.

In some implementations, the digital certificate template indicates positions of the name of the course, name of the institution, and the name of the first student to be displayed upon the first digital certificate.

In some implementations, the certificate generation module is configured to publish a second digital certificate upon a second webpage at a second URL different than the first URL and based on the digital certificate template, the second digital certificate also indicating that a second student has completed the course, the first student and the second student being different.

In some implementations, the URLs are based on a corresponding certificate identifier determined upon generation of the first digital certificate and the second digital certificate.

In some implementations, the system includes a management module configured to receive a request a request to change information displayed upon the first digital certificate from the first student, and the management module configured to update content displayed upon the first digital certificate to reflect the change requested.

In some implementations, the system includes a management module configured to receive a request a request to change information displayed upon the first digital certificate from the first student, and the management module configured to update content displayed upon the first digital certificate to reflect the change requested.

In some implementations, the system includes a management module configured to receive additional information related to the course from the first student and publish additional information on the first webpage including the first digital certificate.

In some implementations, the additional information includes a course transcript, a recommendation from a teacher providing the course, or work product completed by the student during the course.

In some implementations, the management module is further configured to provide a recommendation to the first student regarding another course to complete, the recommendation based on one or both of the name of the course or the additional information provided by the first student.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: receive organization information representing a name of an institution providing a course; receive group information representing a name of the course; generate a digital certificate template representing a layout of information to be displayed upon digital certificates to be issued to students who have taken the course, the information to be displayed upon the digital certificates including the name of the institution and the name of the course; receive a list of names of students who have completed the course, the list of names including a first student; and generate a first digital certificate based on the digital certificate template and indicating that the first student has completed the course, the generating including generating a first webpage providing the first digital certificate as a representation that the first student has completed the course.

In some implementations, the first digital certificate includes content indicating the name of the course, the name of the institution, and the name of the first student.

In some implementations, the list of names also includes a second student, and the computer program instructions cause the one or more computing devices to: generate a second digital certificate based on the digital certificate template and indicating that the second student has completed the course.

In some implementations, the computer program instructions cause the one or more computing devices to: generate a second webpage providing the second digital certificate as a representation that the second student has completed the course, each of the first webpage and the second webpage having different universal resource locators (URLs).

In some implementations, the URLs are based on a corresponding certificate identifier determined upon generation of the first digital certificate and the second digital certificate.

In some implementations, the computer program instructions cause the one or more computing devices to: receive a request to change information displayed upon the first digital certificate from the first student; and update content displayed upon the first digital certificate to reflect the change requested.

In some implementations, the computer program instructions cause the one or more computing devices to: receive, from the first student, additional information related to the course; and publish the additional information on the first webpage including the first certificate.

In some implementations, the additional information includes a course transcript, a recommendation from a teacher providing the course, or work product completed by the student during the course.

In some implementations, the computer program instructions cause the one or more computing devices to: provide a recommendation to the first student regarding another course to complete, the recommendation based on one or both of the name of the course or the additional information provided by the first student.

Some of the subject matter described herein also includes a method, comprising: generating, by a processor, a digital certificate published on a webpage, the digital certificate representing completion of a course that is provided by an institution by a student; receiving additional information related to the course from the student, the additional information including one or more of a course transcript, a recommendation from a teacher providing the course, or work product completed by the student for the course; publishing the additional information on the webpage with the digital certificate; and recommending the student to take another course or contact another student based on content of the additional information published on the webpage.

DETAILED DESCRIPTION

Figure 1:
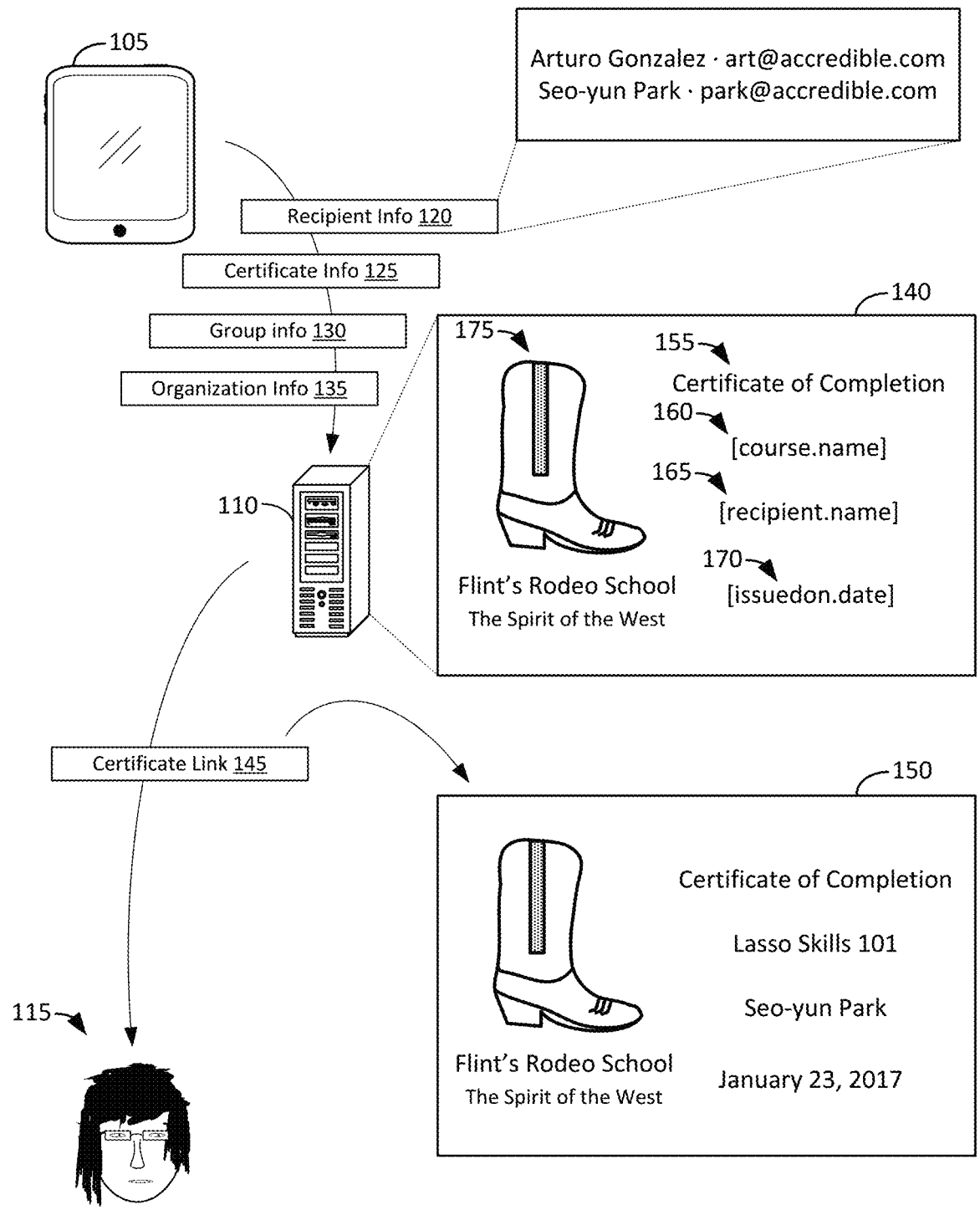
FIG. 1 illustrates an example of managing digital certificates.

This disclosure describes devices and techniques for managing digital certificates. An organization such as a university, a trade school, a company, etc. might provide certificates to students (e.g., university students, employees, etc.) upon completion of training. For example, a trade school might offer a variety of courses for people to learn new skills. For each course completed by a student, a certificate can be printed and mailed to the student to provide proof of the student's accomplishment of completing the course. However, printing and mailing certificates for each student can be expensive and time-consuming if there are hundreds or thousands of students enrolled in several courses. Additionally, printed certificates can be forged.

As described herein, digital certificates can be managed to easily provide and maintain certificates for students in a lower cost, less time-consuming, and more secure manner. In one example, an organization can provide organizational information (providing details regarding its organization name, name and position of an official such as John Doe being an Executive Director, organization's logo, etc.), group information (providing information regarding a course of study such as a course name and description), certificate information (providing a design or layout of a certificate), and recipient information (providing names and contact information of students that should be provided certificates) to a certificate server. This data can be stored and the server can generate unique certificates for each of the students indicated in the recipient information and based on the organizational information, group information, and certificate information. Each certificate can also be published on a webpage and accessible via a unique universal resource locator (URL), for example, by having each certificate associated with a unique identifier and the URL provided can include or be generated based on that unique identifier. Students can then each be emailed a link (e.g., of the URL) to their certificate. When a student selects the link, the server can then provide access to their digital certificate indicating the completion of coursework. The link can then be shared with others by the student to offer proof of completion of the coursework.

The students can also manage their own certificates at the webpage. For example, a student can select for their certificate to be private (i.e., no longer accessible to others via the webpage), promote the certificate via other services (e.g., publish to a social media account), download a copy of the certificate, or even request the organization to modify the content of the certificate (e.g., to change the name on the certificate). Additionally, the student can provide additional information related to the coursework that resulted in the certificate, for example, grades, graded exams and/or papers, recommendations or references from the teacher, projects (e.g., code or art prepared during the coursework), etc.

Additionally, the organization can be provided with analytics regarding the usage of the certificates by the students. For example, how often certificates are viewed, whether students are publishing certificates via other services, the type of additional information being provided, etc. can all be determined. Moreover, the organization can manage the certificates, for example, by changing names (e.g., if students change names, fix typos, etc.), changing the organization's name (e.g., if the organization has changed its operating name), etc. The organization can also revoke certificates.

In more detail, FIG. 1 illustrates an example of managing digital certificates. In FIG. 1, device 105 can be a computing device (e.g., a touchscreen tablet device, a laptop computer, desktop computer, etc.) used to provide a variety of information regarding certificates to be managed by server 110. For example, server 110 can receive organization information 135 indicating a name of the organization (e.g., the certification-granting authority), name of a director or administrator that should be provided on certificates, a graphical image to be provided as a logo on a certificate, etc. This information can be displayed as content on a certificate, as discussed later herein. This data can also be used for many certificates for students who have taken courses with the organization.

In addition, server 110 can also be provided with group information 130. Group information 130 can indicate a course name and a description of that course (e.g., the topic of the course associated with what students learn when taking the course).

Certificate information 125 can also be received, and it can indicate the type of information to be placed on a certificate and the layout of the information placed upon that certificate. For example, device 105 can utilize a what-you-see-is-what-you-get (WYSIWYG) style of editor provided on a web page hosted by server 110. Using this editor, various types of information can be selected or indicated to be displayed on a certificate generated using certificate template 140. Additionally, the information can be moved around and placed at specific positions. For example, in FIG. 1, logo 175 can be the organization's graphical logo (as provided via organization information 135) and placed at its position as indicated in FIG. 1.

Certificate title 155, course name identifier 160, recipient name identifier 165, and issued on date identifier 170 can also be selected to be published upon certificates. Course name identifier 160, recipient name identifier 165, and issued on date identifier 170 can be placeholders for data that should be pulled from group information 130, recipient information 120, or generated upon the creation or publication of a certificate based on certificate template 140. For example, the same certificate template 140 can be used for different group information for different courses. Thus, different group information 130 being used can result in different content on certificates using the same certificate template 140. Likewise, different students of recipient information 120 (as discussed later) result in different names published on a certificate generated using certificate template 140. Issued on date identifier 170 can indicate that server 110 should determine the date when a certificate is to be published and use that date on the certificate.

Recipient information 120 can be a list of names of students and information related to the students such as their contact information (e.g., email address). The names can be used to be published on a certificate and the email can be used to communicate to the student that a certificate is available. In some implementations, the recipient information can be provided to credential server 110 in FIG. 1 in a spreadsheet. Server 110 can receive the spreadsheet and parse (e.g., extract) the recipient names and emails from it. All of the information received can be stored, for example, in a database on server 110.

Thus, a variety of data or information can be received and/or generated, including the creation of certificate template 140 used to generate certificates such as certificate 150. Student 115 can then be provided certificate link 145 providing access to certificate 150. For example certificate link 145 can be a URL generated by server 110 and provides access to certificate 150. As depicted in FIG. 1, certificate 150 includes information regarding the course (e.g., "Lasso Skills 101"), the name of student 115 (e.g., "Seo-yun Park"), and the date that certificate 150 was generated by server 140 as the date it was issued (e.g., "Jan. 23, 2017"). Another student might receive another certificate link with a different URL providing access to another certificate for the same course, but with a different name. As a result, a digital certificate representing a credential of a student can be generated and viewed.

Figure 2:
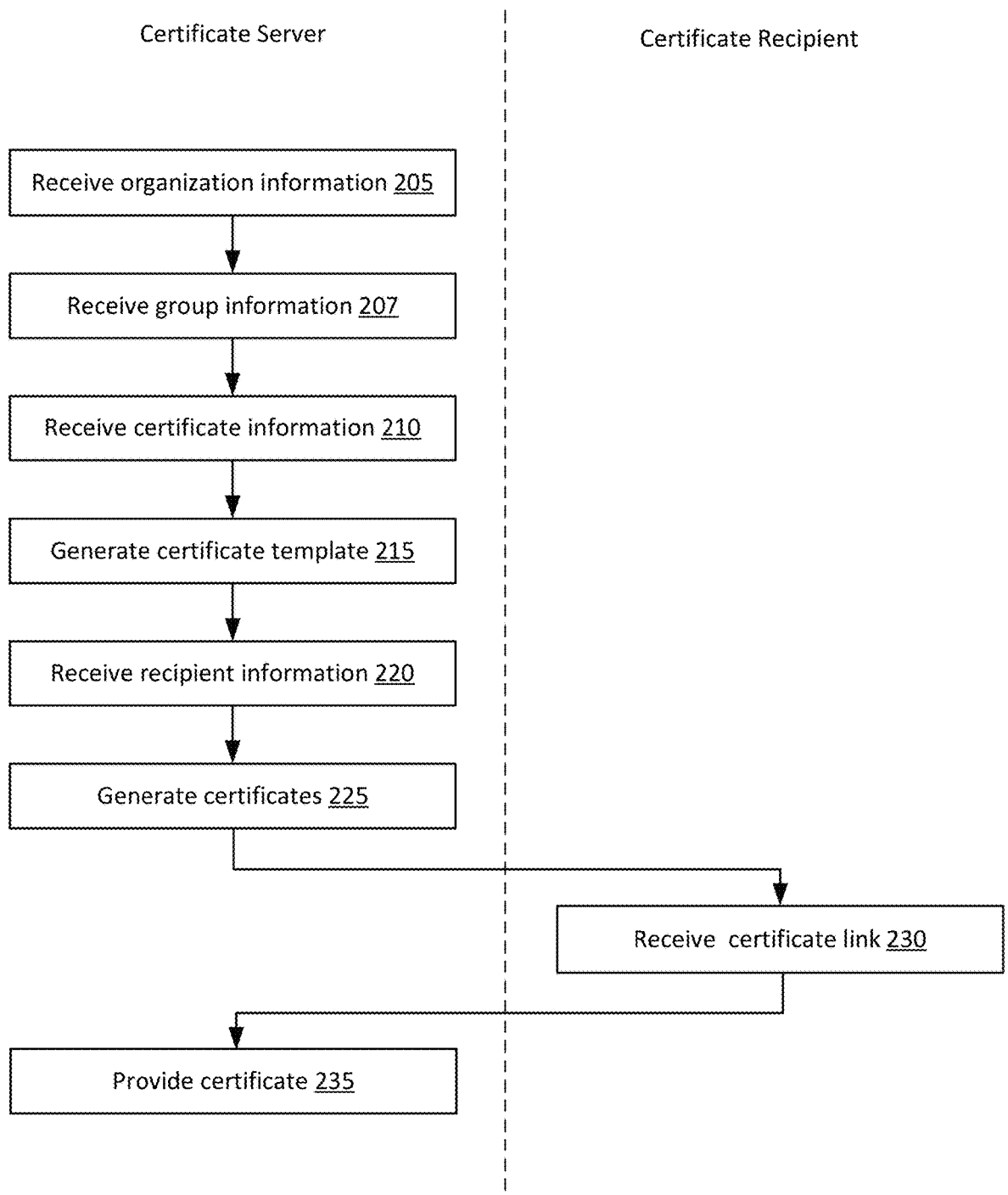
FIG. 2 illustrates an example of a block diagram for managing digital certificates.

FIG. 2 illustrates an example of a block diagram for managing digital certificates. In FIG. 2, organization information can be received (205). As previously discussed, this can include the name of the organization, the name of an employee or executive whose name can appear on a certificate as an authority figure authorizing the certificate, location of the organization, etc. The information can be stored in a database, for example, of server 110 in FIG. 1.

Figure 3:
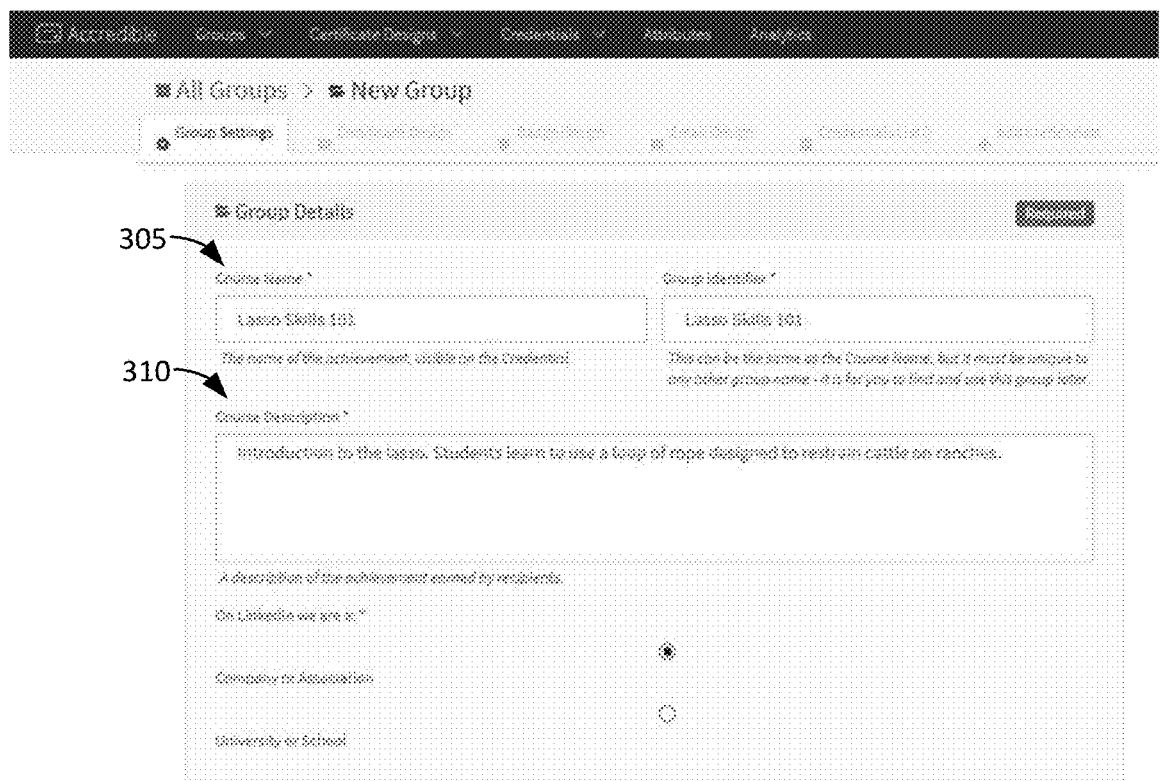
FIG. 3 illustrates an example of receiving group information.

Returning to FIG. 2, group information can be received (207). The information can be also stored in a database, for example, of server 110 in FIG. 1. FIG. 3 illustrates an example of receiving group information. In FIG. 3, the group information can include a course name 305 (e.g., "Lasso Skills 101") and course description 310 (e.g., "Introduction to the lasso. Students learn to use a loop of rope designed to restrain cattle on ranches."). The course description can provide a short summary regarding the subject matter of the course. Whether the organization is a company or association, or a university or school can also be indicated.

Figure 4:
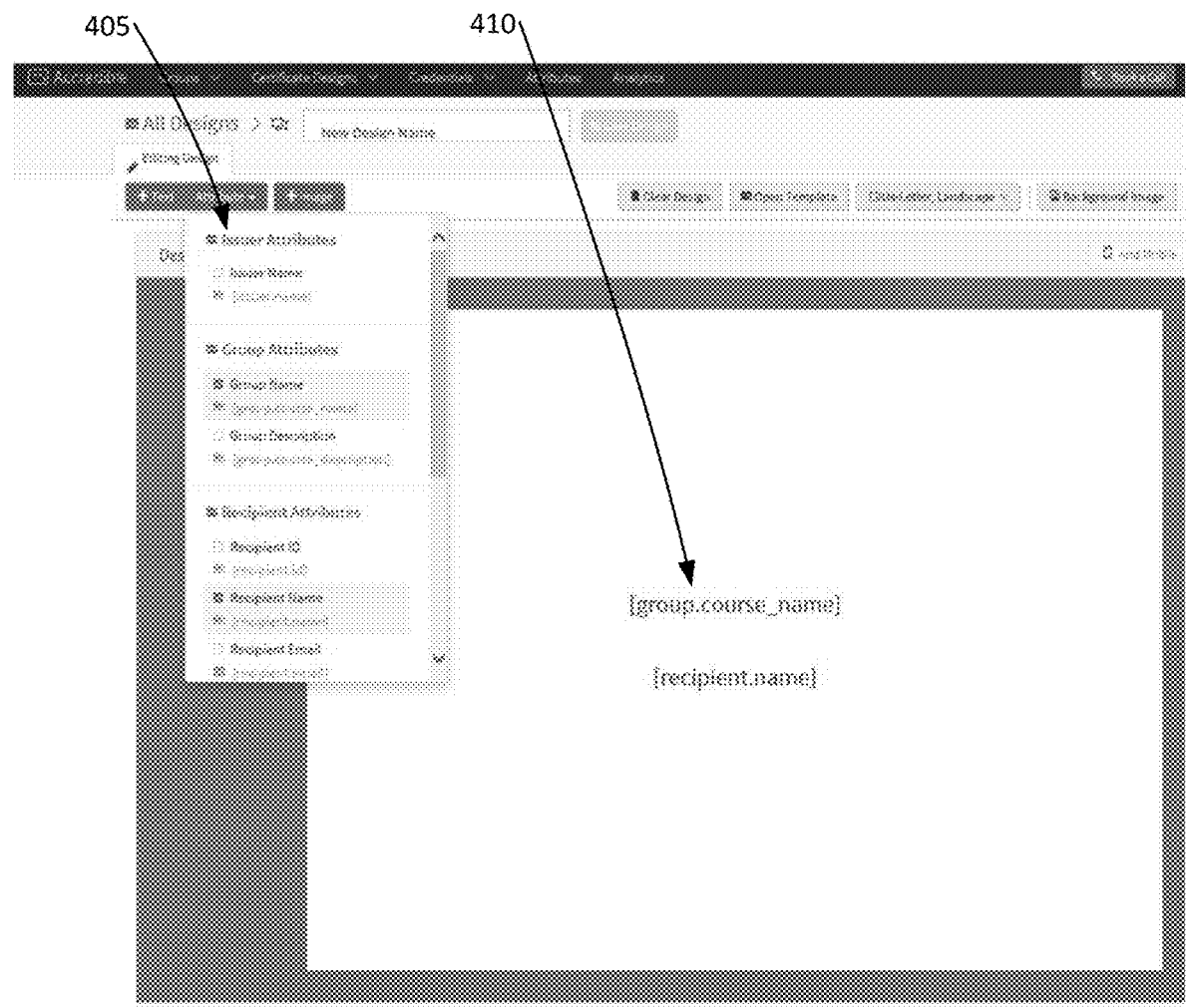
FIG. 4 illustrates an example of certificate information.

Certificate information can also be received (210). The information can be also stored in a database, for example, of server 110 in FIG. 1. FIG. 4 illustrates an example of certificate information. As previously discussed, the certificate information can indicate the type of information to be placed on a certificate and the layout of the information and other content placed upon that certificate. For example, in FIG. 4, menu 405 can include a variety of types of certificate information that can be selected to be displayed upon a certificate via the generation of a certificate template. This information can be selected from the organization information, group information, recipient information, or be generated by server 110. For example, in FIG. 4, the Igroup-.course_namer can be an identifier indicating that some information from group information received in block 207 corresponding to the name of the course should be displayed. The course name on a certificate would be placed at the current location as indicated in FIG. 4. If the user wanted to change the layout of the information of the certificate, the identifier can be moved. Additionally, other identifiers can be added to include new content for the certificate. Graphics such as organizational logos, background images, etc. can also be placed.

Figure 5:
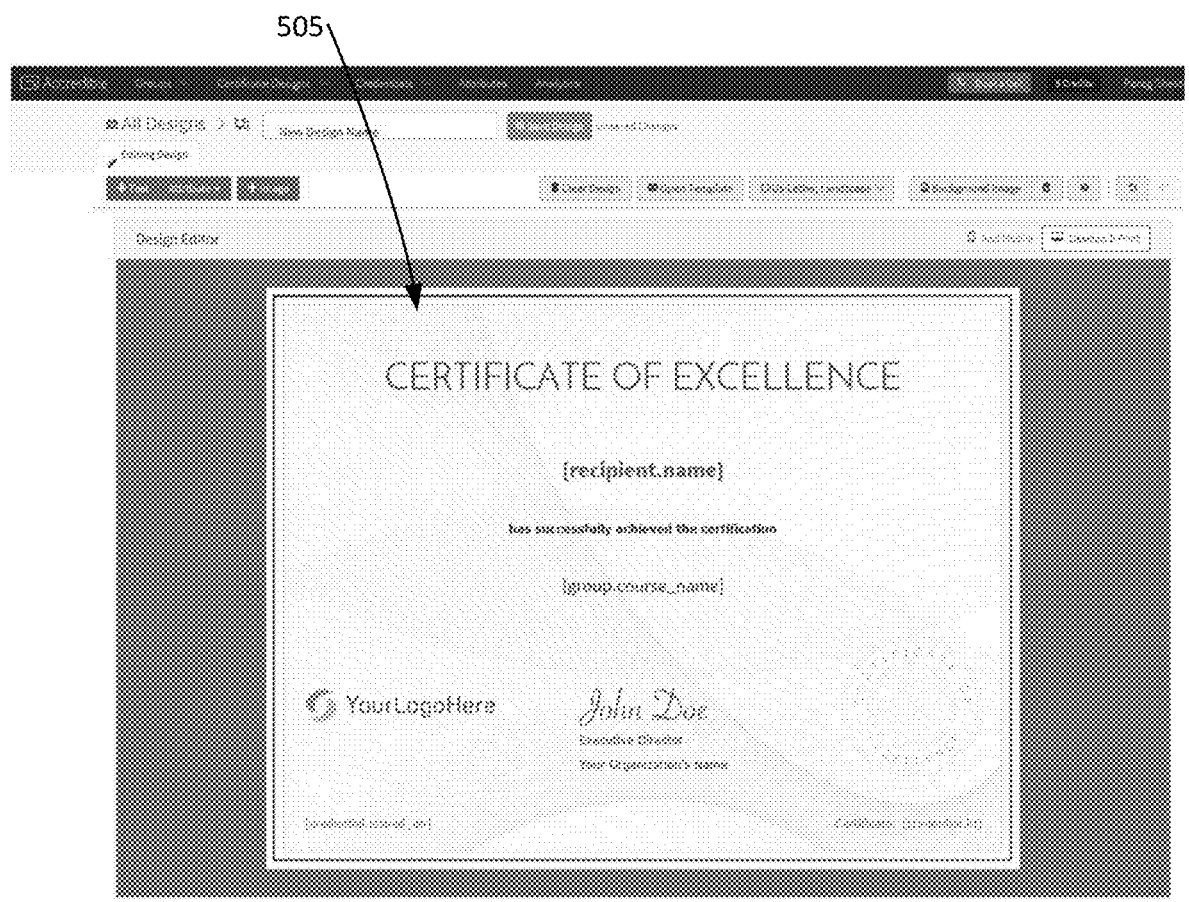
FIG. 5 illustrates an example of a certificate template.

Once the certification information is received, a certificate template can be generated (215). The information can be also stored in a database, for example, of server 110 in FIG. 1. FIG. 5 illustrates an example of a certificate template. In FIG. 5, a visualization of certificate template 505 is shown with identifiers for a recipient name (e.g., the location for a name of a student to be placed on a certificate generated using certificate template 505), the date that the certificate was issued on, and a certificate identifier. The certificate identifier can be a unique identification (e.g., a unique number, letters, or combination of numbers and letters) that can be generated to identify each unique certificate generated.

Recipient information can also be received (220). The information can be also stored in a database, for example, of server 110 in FIG. 1. The recipient information can indicate the names and contact information of persons who should receive a certificate based on certificate template 505. For example, the names and email addresses can be received. Once the names are received, certificates can be generated (225). For example, using certificate template 505, and the various types of data received (e.g., organization information, group information, and recipient information), a certificate can be generated for each person named in the recipient information. Additionally, each certificate that is generated can be published on a webpage at a URL including a unique identifier. For example, a webpage at a URL including the unique identifier within its address can be generated and include the credential. Thus, many webpages at unique URLs can be generated for each of the certificates for the different recipients. Though the name of the recipients on the certificates are different, some of the information such can be similar, for example, the course name as received via the group information.

Figure 6:
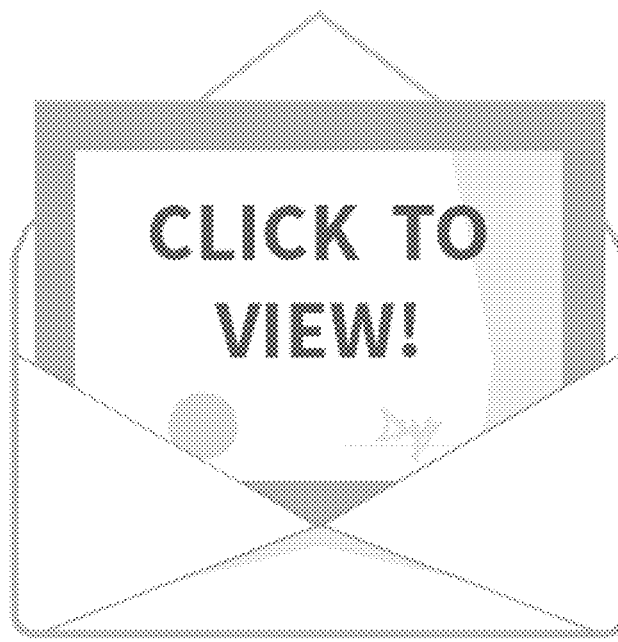
FIG. 6 illustrates an example of providing certificate link.
Figure 7:
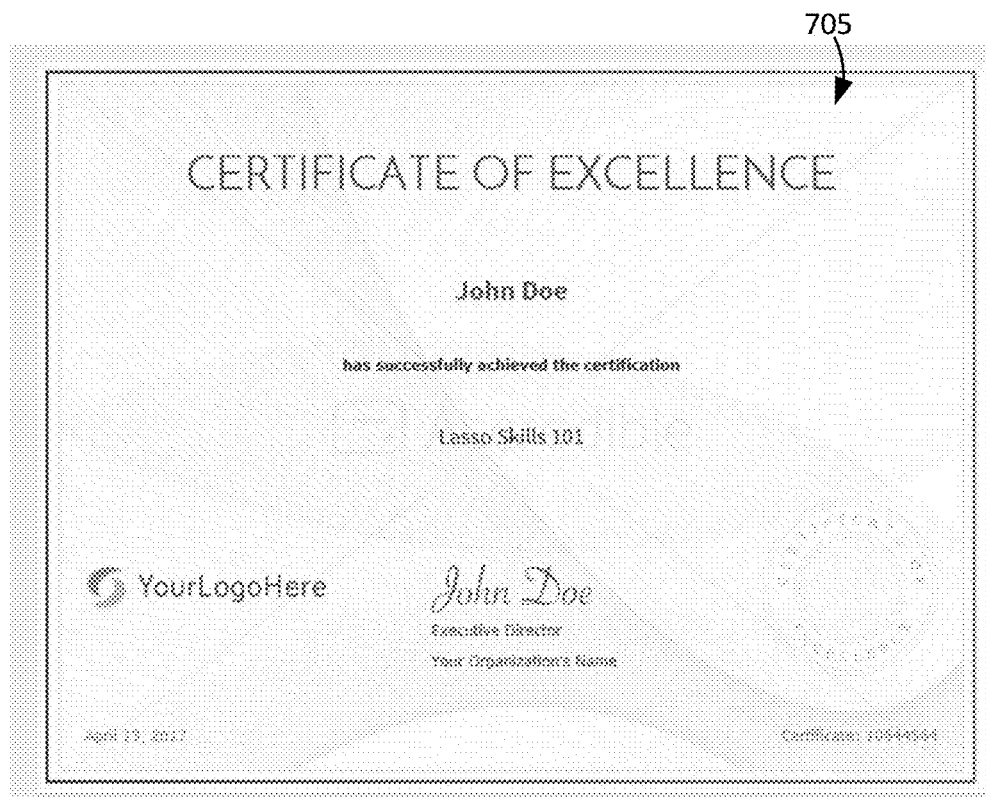
FIG. 7 illustrates an example of a certificate.

A recipient can then receive a certificate link (230). For example, because the recipient information includes the email addresses for the recipients, each student can receive an email with the unique URL of their corresponding certificate. FIG. 6 illustrates an example of providing certificate link. In FIG. 6, correspondence 605 can be an email provided to a recipient using the email address provided via recipient information. As indicated in FIG. 6, the email can include the URL with a unique identifier identifying the certificate for that user. Returning to FIG. 2, if the recipient selects the link, the certificate server can then provide the certificate (235). For example, the certificate can be provided via a webpage hosted by server 110 for display on a display screen of the computing device used by the student selecting the link. FIG. 7 illustrates an example of a certificate. In FIG. 7, certificate 705 is generated based on the certificate template. That is, certificate template 505 in FIG. 5 is used to generate certificate 705 in FIG. 7 with the identifiers filled out with the appropriate information, for example, the recipient's name and the course name displayed upon certificate 705. In FIG. 7, the date that the certificate was issued and the certificate identifier can also be displayed.

Figure 8:
FIG. 8 illustrates an example of a dashboard for a certificate.

A recipient of the certificate can also be provided an opportunity with a variety of administrative functionalities for the certificate. FIG. 8 illustrates an example of a dashboard for a certificate. In FIG. 8, certificate 705 is presented alongside an administrative control panel 805 providing additional features for a certificate recipient (e.g., a student). For example, in FIG. 8, the student can change the privacy settings for the certificate such that it is private (i.e., the URL for the certificate no longer provides a webpage configured for the display of certificate 705 unless the student himself or herself is logged into the certificate server). Thus, the student can access the webpage using the URL for certificate 705 and change their privacy settings such that certificate 705 can no longer be available for the public. In some implementations, the student can indicate that the certificate can be viewed upon the entry of a correct password. As a result, only authorized persons would be able to view certificate 705.

Additionally, the student can promote certificate 705 onto a social media account, add it to an email signature, or email it to someone else. For example, the student can publish a note regarding certificate 705 onto a business-oriented social media platform (e.g., Linkedin®) so that it is provided with other professional-related information regarding the student such as resume details.

Moreover, administrative control panel 805 can offer the capability download a copy of certificate 705 (e.g., in an Adobe® PDF file format). This can be useful if the student wants to print out a paper copy of certificate 705. Moreover, administrative control panel 805 can also offer the student the opportunity to request modifications to certificate 705. For example, if the student has married and changed his or her name, then the student can request a name change. The student can provide the name, the organization can receive a message from the certificate server that the student has requested the name to be changed, view the new requested name, and approve it. If approved, the name on certificate 705 can be updated to reflect the new requested name that was approved.

Figure 9:
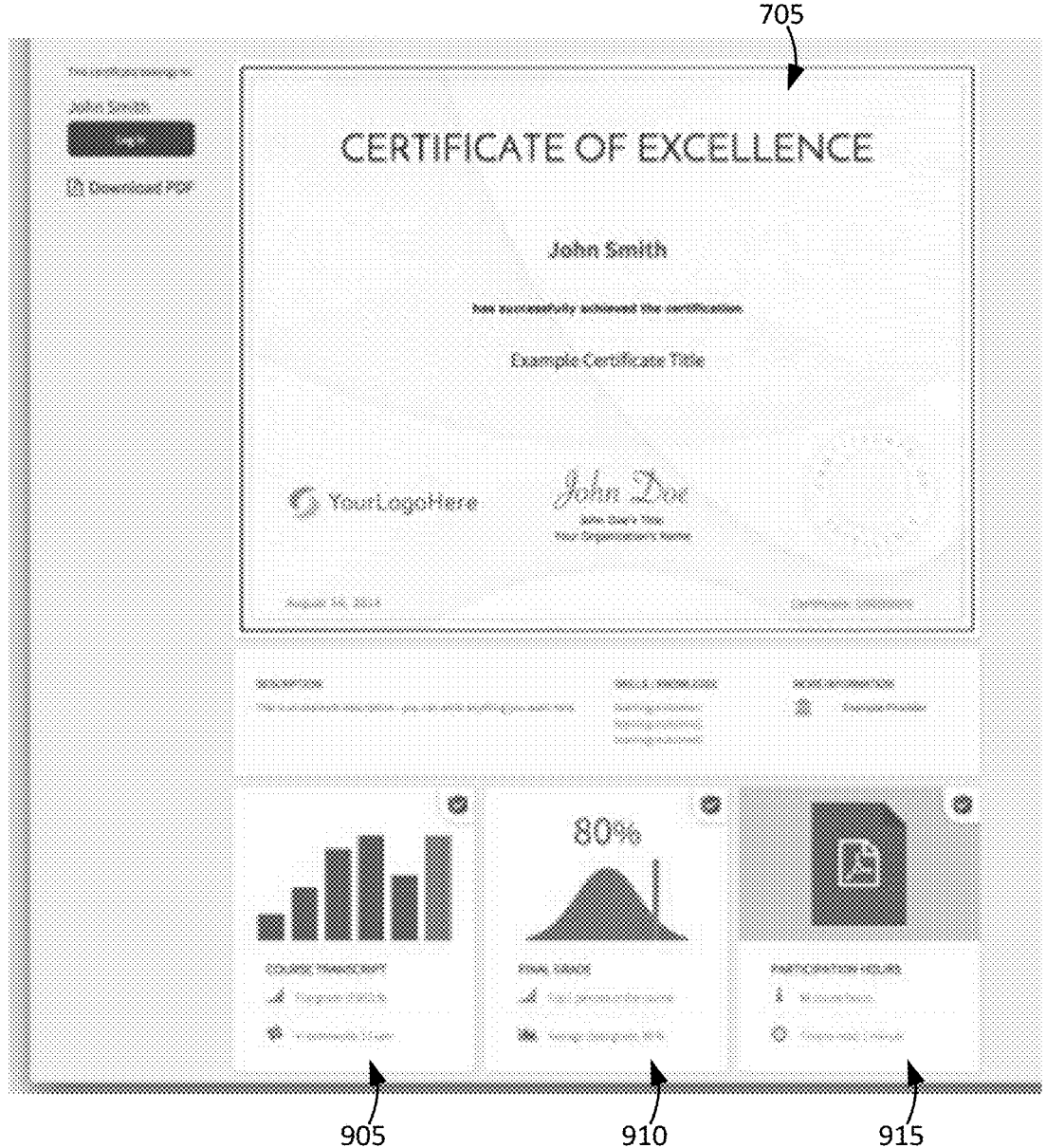
FIG. 9 illustrates an example of additional information related to the certificate.

The student can also provide additional information related to the course related to certificate 705. FIG. 9 illustrates an example of additional information related to the certificate. In FIG. 9, course transcript 905, final grade 910, and participation hours 915 can be added by a student to provide additional information for others to view. This allows for the student to provide more information than just the completion or attendance of a course as indicated in the providing of certificate 705. The student can also include references, recommendations, examples of work product (e.g., software code, art created by the student, etc.) related to the course.

In some implementations, the additional information can be uploaded by the student. In other implementations, the additional information can be provided by the organization issuing certificate 705. For example, when certificate 705 is generated by providing the various information as discussed above, the information can also include the additional information such as a transcript, grade, teacher recommendation, etc. that can also be included on the webpage with certificate 705. In some implementations, the student can select or indicate that the information should be provided. For example, server 110 can indicate that the organization has also uploaded the aforementioned details regarding the student's participation in the course and the student can select which ones should be published with certificate 705. Thus, if a transcript and teacher recommendation are available, the student can decide to include the teacher recommendation to be published with certificate 705, but exclude the transcript.

Figure 10:
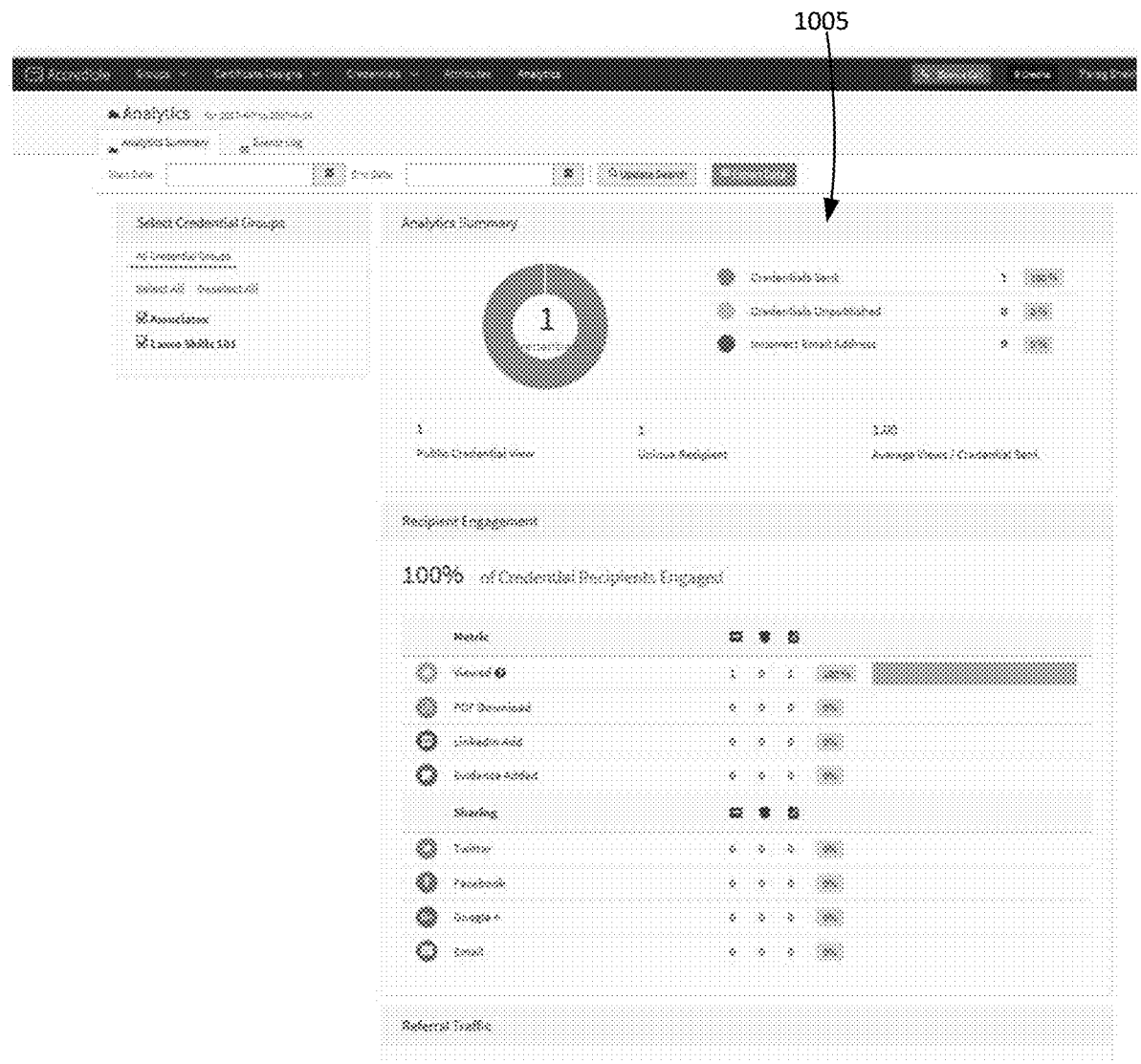
FIG. 10 illustrates an example of an analytic dashboard regarding the use of certificates.

The organizations can also learn insights regarding their students from the use of the certificates. FIG. 10 illustrates an example of an analytic dashboard regarding the use of certificates. In FIG. 10, analytics dashboard 1005 can provide information regarding how students are using their certificates. How often certificates within a group (e.g., for a particular course) are viewed, copies downloaded, how many times a certificate is published to a social media account or emailed to another person, or how many certificates are associated with students who have added additional information as discussed with respect to FIG. 9. This can provide an organization with some knowledge regarding which courses are more popular, or which courses provide students with interesting material (e.g., examples of work product) that they like to provide with their certificates.

Figure 11:
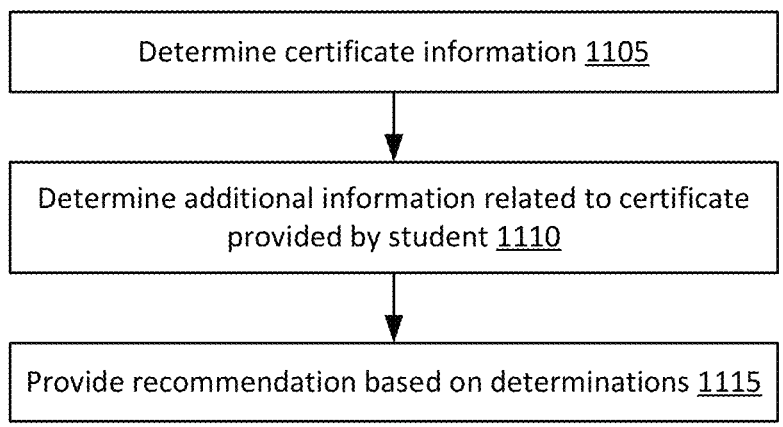
FIG. 11 illustrates an example of providing a recommendation based on the certificate or additional information related to the certificate.

The information corresponding to certificate 705 and the additional information provided by the student as discussed above can also be analyzed to provide recommendations regarding further courses that the student can register for, or other professionals that the student might want to contact for networking purposes. FIG. 11 illustrates an example of providing a recommendation based on the certificate or additional information related to the certificate. In FIG. 11, certificate information can be determined (1105). For example, the name of the course, the type of field that the course is within (e.g., electrical engineering, history, etc.), the institution issuing the certificate (e.g., the university that the student attended for the course), etc. regarding certificate 705 that is published can be determined. Information regarding the additional information uploaded by the student that is related to the certificate can also be determined (1110). For example, the student can upload transcripts, information regarding a final project for the course, etc. as previously discussed. The specific types of additional information, the content of the additional information, etc. can be determined. A recommendation can then be provided based on the determination (1115). For example, the student can be recommended to take another course. For example, if the student is determined to have taken one course due to being issued certificate 705, and the student uploaded a transcript or other type of data indicating that their grade was a C (e.g., a grade within a range corresponding to a low grade), then they might be recommended to take a related course to relearn some of the subject matter. In some implementations, the student can then submit a request to register for the course. The request can be received by the server 110 so that the course provider can be informed that the student wishes to enroll in another course. In another example, if the student had a grade of an A (e.g., a grade within a range corresponding to a high grade), then the student can be recommended to take a more advanced course that builds upon the subject matter of the course associated with certificate 705. In another example, the student can be recommended to contact, link or connect via professional social networking site, etc. another student based on the determinations. For example, students taking similar courses might be employed in the same industry and, therefore, informing students of other students with similar experience with courses can provide an intuitive networking opportunity. In some implementations, the grades of students as uploaded as additional information can be analyzed and students can be recommended to contact others based on the grades. For example, students with similar grades might be matched, or students with different grades might be matched for facilitate mentoring (e.g., a higher grade student might be matched with a lower grade student).

In some implementations, the certificates can have an expiration date. Thus, the certificate provided at the URL can be revoked (e.g., the webpage at the URL can be removed, the certificate can no longer be publicly accessible, etc.) upon the expiration date.

In some implementations, the organizations can also be provided with a readout of all of the credentials that they have issued, the students who have received credentials and which credentials they have received, and how many credentials they have issued.

In some implementations, the organizations can also modify the design of the credentials that have been previously issued. For example, in addition to changing the names of a recipient, the layout of the content of the credentials can be changed by adjusting the certificate template. For example, by moving the location of the identifier for a recipient name, the names of the students on the certificates that were previously generated can be moved to the location as in the adjusted certificate template. Thus, changing the certificate information that the certificates were based on and result in those certificates to be updated with the new certificate information. This can include moving the location of some of the content of the certificates or even the addition or removal of content to the certificates. For example, if certificate information such as the issue date identifier is removed such that the certificate template would no longer include it, then the generated certificates can be updated such that the issue dates are no longer displayed upon the certificates.

Figure 12:
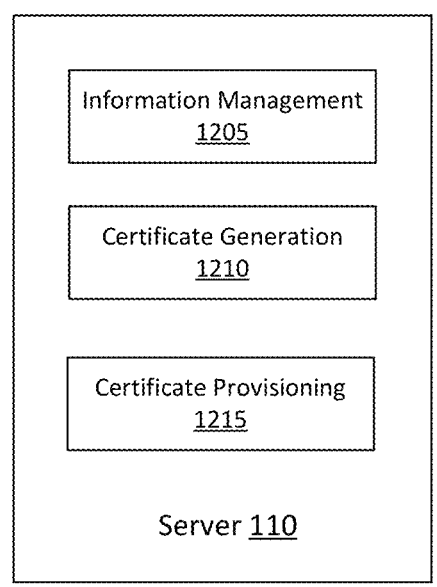
FIG. 12 illustrates an example of components of a server for managing certificates.
Figure 13:
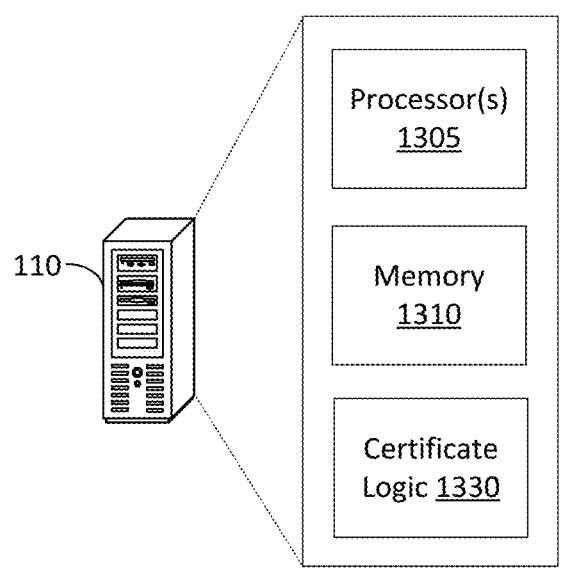
FIG. 13 illustrates an example of a computing device for managing certificates.

FIG. 12 illustrates an example of components of a server for managing certificates. FIG. 13 illustrates an example of a computing device for managing certificates. In FIG. 13, server 110 includes a processor 1305, memory 1310 as well as other types of hardware such as non-volatile memory, an interface device, etc. to implement certificate logic 1330 providing the techniques disclosed herein. For example, certificate logic 1330 can include the components or modules depicted in FIG. 12, such as information management 1305 configured to receive and store the various types of organization, group, certificate, and recipient information as discussed herein, certificate generation 1310 to generate a certificate template and certificates based on the certificate template, and certificate provisioning 1315 configured to publish certificates and email recipients regarding their certificates.

Various common components (e.g., cache memory) are omitted for illustrative simplicity. The assistant device is intended to illustrate a hardware device on which any of the components described in the example of FIGS. 1-11 (and any other components described in this specification) can be implemented. The components of the assistant device can be coupled together via a bus or through some other known or convenient device.

The processor 1305 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 1305 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system comprising:
    a database configured to store identifying information of an institution administering a program, group information representing identifying information of the program, and a digital certificate template representing a layout of content to be displayed on digital certificates published on electronic documents for recipient participants who have completed the program;
    a digital certificate generation module including hardware configured to publish a first digital certificate on a first electronic document based on the digital certificate template, the first digital certificate representing that a first recipient participant has completed the program, the first digital certificate including the identifying information of the program and the identifying information of the institution;
    a digital certificate provisioning module including hardware configured to provide a first electronic message to the first recipient participant providing access to the first electronic document with the first digital certificate; and
    a management module including hardware configured to provide a recommendation to the first recipient participant to contact a second participant based on the first digital certificate of the first recipient participant and additional information provided by the first recipient participant.

2. The system of claim 1, wherein the additional information indicates performance of the first recipient participant while in the program.

3. The system of claim 1, wherein the additional information includes a recommendation for the first recipient participant from another participant.

4. The system of claim 1, wherein the additional information includes a work product completed by the first recipient participant during the program.

5. The system of claim 1, wherein the first digital certificate includes content indicating the identifying information of the program, the identifying information of the institution, and identifying information of the first recipient participant.

6. The system of claim 1, wherein the digital certificate template indicates locations of the identifying information of the program, the identifying information of the institution, and identifying information of the first recipient participant to be displayed upon the first digital certificate.

7. The system of claim 1, wherein the digital certificate generation module is configured to publish a second digital certificate upon a second electronic document different from the first electronic document and based on the digital certificate template, the second digital certificate also indicating that a second recipient participant has completed the program, the first recipient participant being different from the second recipient participant.

8. The system of claim 1, wherein each of the electronic documents are associated with electronic links that are based on a corresponding certificate identifier determined upon generation of the first digital certificate and the second digital certificate.

9. The system of claim 1, wherein the management module is further configured to:
    receive a request to change information displayed upon the first digital certificate from the first recipient participant; and
    update content displayed upon the first digital certificate to reflect the requested change.

10. The system of claim 1, wherein the management module is further configured to receive the additional information related to the program from the first recipient participant and publish the additional information on the first electronic document including the first digital certificate.

11. The system of claim 1, wherein an additional recommendation to the first recipient participant regarding another program is based on one or both of the identifying information of the program or the additional information provided by the first recipient participant.

12. A method for publishing digital certificates on a computer network, the method comprising:
    generating, by a computer system on the computer network, a digital certificate template for digital certificates to be issued to recipient participates of a program;
    receiving, by the computer system, recipient information indicating recipient participants that completed the program and should receive digital certificates, the recipient information indicating respective identifying information and contact information for each of the recipient participants;
    publishing, by the computer system, respective digital certificates for each of the recipient participants at a respective electronic document associated with the corresponding recipient participant, each of the digital certificates being generated based on the digital certificate template and including identifying information of the respective recipient participant as indicated by the recipient information;
    sending, by the computer system, an electronic communication to each of the recipient participants based on the participant information, each electronic communication including an electronic link to a corresponding electronic document on which a corresponding digital certificate of the recipient participant is published;
    providing the digital certificates for display on the corresponding electronic document based on the electronic link; and
    providing a recommendation to each of the recipient participants to contact another participant of the program based on a corresponding digital certificate of the recipient participant and additional information.

13. The method of claim 12 further comprising, prior to generating the digital certificate template:

receiving, by the computer system, organization information identifying an organization that administers the program; and receiving, by the computer system, content for the digital certificates and locations of the content on the digital certificates, the content being based on the organization information.

14. The method of claim 12, wherein the additional information includes indication of performance by the recipient participant while in the program.

15. The method of claim 12, wherein the additional information includes a recommendation from another participant of the program.

16. The method of claim 12, wherein the additional information includes identifying information of an organization that administers the program.

17. The method of claim 12, wherein a digital certificate includes content indicating identifying information of the program, identifying information of an organization that administers the program, and the identifying information of the recipient participant.

18. The method of claim 12, wherein each recipient participant is associated with a webpage for publishing the corresponding digital certificate.

19. The method of claim 12, wherein the electronic communication is an email.

20. A computer program product, comprising one or more non-transitory computer- readable media having computer program instructions stored therein, the computer program instructions being configured such that, when executed by one or more computing devices, the computer program instructions cause the one or more computing devices to:

generate a digital certificate template representing a layout of information to be displayed upon digital certificates to be issued to respective recipient participants who have taken a program, the information to be displayed upon the digital certificates including identifying information of an institution that administered the program or identifying information of the program;

receive a list of identifying information of recipient participants who have completed the program, the list of identifying information including a first recipient participant;

generate a first digital certificate based on the digital certificate template and indicating that the first recipient participant has completed the program, the generating including generating a first electronic document providing the first digital certificate as a first representation that the first recipient participant has completed the program; and provide a recommendation to the first recipient participant to contact a second participant based on the first digital certificate of the first recipient participant and additional information provided by the first recipient participant.

21. The computer program product of claim 20, wherein the first digital certificate includes content indicating the identifying information of the program, the identifying information of the institution, and identifying information of the first recipient participant.

22. The computer program product of claim 20, wherein the list of identifying information includes a second recipient participant, and the computer program instructions cause the one or more computing devices to:

generate a second digital certificate based on the digital certificate template and indicating that the second recipient participant has completed the program.

23. The computer program product of claim 20, the computer program instructions cause the one or more computing devices to:

generate a second electronic document providing the second digital certificate as a second representation that the second recipient participant has completed the program, each of the first electronic document and the second electronic document are webpages that have different universal resource locators (URLs).

24. The computer program product of claim 23, wherein each of the URLs are based on a respective corresponding certificate identifier determined upon generation of the first digital certificate and the second digital certificate.

25. The computer program product of claim 20, the computer program instructions cause the one or more computing devices to:

receive a request to change information displayed on the first digital certificate from the first recipient participant; and update content displayed on the first digital certificate to reflect the change requested.

* * * * *